United States Patent [19]

Schilling

[11] Patent Number: 5,351,269
[45] Date of Patent: Sep. 27, 1994

[54] OVERLAYING SPREAD SPECTRUM CDMA PERSONAL COMMUNICATIONS SYSTEM

[75] Inventor: Donald L. Schilling, Sands Point, N.Y.

[73] Assignee: SCS Mobilecom, Inc., Port Washington, N.Y.

[21] Appl. No.: 622,235

[22] Filed: Dec. 5, 1990

[51] Int. Cl.$^5$ .............................................. H04K 1/00
[52] U.S. Cl. ........................................ 375/1; 380/34; 379/59; 455/33.1
[58] Field of Search .................... 375/1; 380/34, 48; 379/59, 61, 63; 455/33.1, 33.2

[56] References Cited

U.S. PATENT DOCUMENTS

| | | |
|---|---|---|
| 3,831,013 | 8/1974 | Alsup et al. . |
| 3,900,721 | 8/1975 | Speiser et al. . |
| 4,112,372 | 9/1978 | Holmes et al. . |
| 4,222,115 | 9/1980 | Cooper et al. ............... 455/33 X |
| 4,238,850 | 12/1980 | Vance . |
| 4,247,942 | 1/1981 | Hauer . |
| 4,392,232 | 7/1983 | Andren et al. . |
| 4,418,393 | 11/1983 | Zscheile, Jr. . |
| 4,418,425 | 11/1983 | Fennel, Jr. et al. . |
| 4,425,642 | 10/1984 | Moses et al. . |
| 4,455,651 | 6/1984 | Baran . |
| 4,479,226 | 10/1984 | Prabhu et al. . |
| 4,512,013 | 4/1985 | Nash et al. . |
| 4,523,311 | 6/1985 | Lee et al. . |
| 4,553,130 | 11/1985 | Kato . |
| 4,563,774 | 1/1986 | Gloge . |
| 4,606,039 | 8/1986 | Nicolas et al. . |
| 4,612,637 | 9/1986 | Davis et al. . |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibowitz . |
| 4,672,605 | 6/1987 | Hustig et al. . |
| 4,672,629 | 6/1987 | Beier . |
| 4,672,658 | 6/1987 | Kavehrad et al. . |
| 4,675,839 | 6/1987 | Kerr . |
| 4,680,785 | 7/1987 | Akiyama et al. . |
| 4,691,326 | 9/1987 | Tsuchiya . |
| 4,697,260 | 9/1987 | Grauel et al. ............... 379/59 X |
| 4,703,474 | 10/1987 | Foschini et al. . |
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,759,034 | 7/1988 | Nagazumi . |
| 4,789,983 | 12/1988 | Acampora et al. . |
| 4,799,253 | 1/1989 | Stern et al. ................ 455/33 X |
| 4,805,208 | 2/1989 | Schwartz . |
| 4,807,222 | 2/1989 | Amitay . |

(List continued on next page.)

Primary Examiner—Tod R. Swann
Attorney, Agent, or Firm—David Newman & Associates

[57] ABSTRACT

A spread spectrum CDMA communications system for communicating data and/or digitized voice between a plurality of users to a plurality of PCN units. The spread spectrum communications system is located within a same geographical region as occupied by an existing FDMA, proposed TDMA or any other mobile cellular system. The spread spectrum CDMA communications system includes a plurality of PCN-base stations and a plurality of PCN units. A PCN-base station has a comb filter for notch filtering predetermined channels of the mobile cellular system, a device for converting the format of the data into a form suitable for communicating over radio waves, a spread spectrum modulator for spread spectrum processing the data, and transmitter for transmitting the spread spectrum processed converted data from the PCN-base station to a PCN unit. The PCN-base station also has an antenna, and spread spectrum detectors for recovering data communicated from the PCN units. A PCN unit has an antenna, and a detector coupled to the antenna for recovering data communicated from the PCN-base station. The detector includes a spread spectrum demodulator. Also, the PCN unit has a device for converting the format of the data into a form suitable for communicating over radio waves, a spread spectrum modulator and a transmitter.

23 Claims, 9 Drawing Sheets

U.S. PATENT DOCUMENTS

| | | |
|---|---|---|
| 4,837,802 | 6/1989 | Higashiyama et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,901,307 | 2/1990 | Gilhousen et al. . |
| 4,914,651 | 4/1990 | Lusignan .......................... 379/59 X |
| 4,922,506 | 5/1990 | McCalister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. ..................... 375/1 X |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. ....................... 455/33 |
| 5,048,052 | 9/1991 | Hamatsu et al. . |
| 5,056,109 | 10/1991 | Gilhousen et al. . |

| N | $b_0 b_1 \cdots b_{N-1}$ |
|---|---|
| 3 | 011 |
| 4 | 0011 |
| 5 | 00101 |
| 6 | 000011 |
| 7 | 0000011 |
| 8 | 01110001 |
| 9 | 000010001 |
| 10 | 0000001001 |
| 11 | 00000000101 |
| 12 | 010000000111 |
| 13 | 1000000000111 |
| 14 | 01000000000111 |
| 15 | 000000000000011 |
FIG. 12
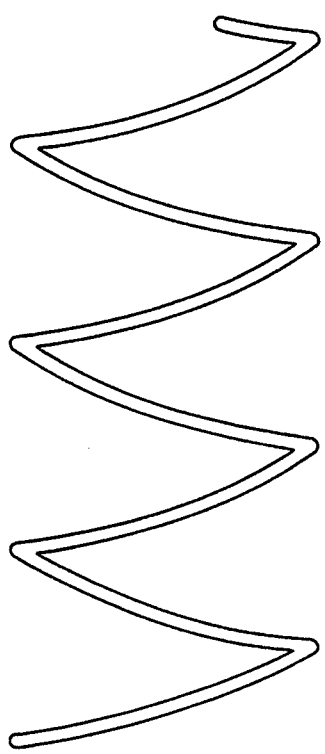
FIG. 9
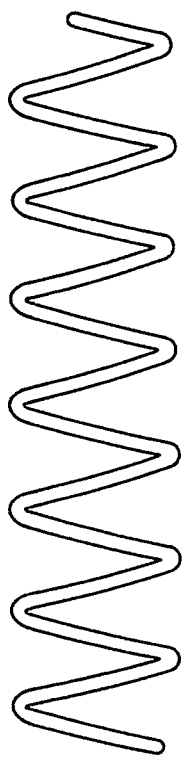
FIG. 10

OVERLAYING SPREAD SPECTRUM CDMA PERSONAL COMMUNICATIONS SYSTEM

BACKGROUND OF THE INVENTION

This invention relates to spread spectrum communications and more particularly to a personal communications network which communicates over the same frequency band of an existing proposed TDMA or any other mobile cellular system.

DESCRIPTION OF THE PRIOR ART

The current mobile cellular system uses the frequency band 868–894 MHz for transmission from the mobile user to the cellular base stations and the frequency band 823–849 MHz for transmission from the cellular base stations to the mobile user. Each these frequency bands is divided in half to permit two competitive systems to operate simultaneously. Thus, each system has 12.5 MHz available for transmission and 12.5 MHz for reception. Each of the 12.5 MHz bands is divided into 30 kHz channels for voice communications.

A problem in the prior art is limited capacity due to the number of channels available in the mobile radio cellular system.

FIG. 1 is a diagram of the cellular system. A mobile user serviced by cell A located near the border of cells A and B and mobile user serviced by cell B located near the same hornier are received by the cellular base stations of cells A and B with almost the same power. To avoid interference between users operating in the same frequency band at comparable power levels, different frequency subbands (channels) are allocated to adjacent cells. FIG. 1 shows a seven frequency scheme, with each cell having a bandwidth, B=12.5 MHz/7, which approximately equals 1.8 MHz. This frequency scheme has adjacent cells operating at different frequencies, thereby reducing interference among users in adjacent cells. This technique is called frequency reuse. As a result of frequency reuse, each cell has N=1.8 MHz/30 kHz=60 channels. Some of these channels are reserved for signalling, leaving approximately 55 channels per cell.

The channels are allocated to cells A, B, and C as shown in FIG. 2. A guard band of 180 kHz separates each channel so that adjacent channel users within the same cell do not interfere with one another.

The cells in a mobile cellular system are expensive to maintain, and profitability can be significantly increased by increasing the number of users per cell. One approach to increase the number of users per cell is to change from analog FM communication, and use digital communication with Time Division Multiple Access (TDMA).

The proposed TDMA mobile cellular system is shown in FIGS. 3A and 3B. In this system, each of the 55 channels per cell is time shared by K users. Currently, K is to be three, as illustrated in FIG. 3B, but this value is expected to increase to six. A cellular base station sequentially probes K users, with a polling each of to the K users uses the same 30 kHz frequency band, but at different times. Using this system, the number of cells does not increase, but since there are K users per 30 kHz channel, the total number of users per cell increases by a factor of K.

K is estimated as follows: Analog voice can be converted to a digital signal having a bit rate of 8500 bits per second (bps) without significant degradation in quality, or to a digital signal having a bit rate of 2400 bps with some degradation in quality. For example, using the bit rate of 2400 bps with a rate $\frac{1}{2}$ forward error correction code (FEC), and a digital modulation technique such as quadrature phase shift keying (QPSK), each digital voice signal requires a bandwidth of only 4800 Hz. Thus, K=30 kHz /4.8 kbps=6 users/30 kHz channel. Potentially, the number of users per cell may be 6 users/channel ×55 channels/cell=330 users per cell.

OBJECTS OF THE INVENTION

An object of the invention is to provide a personal communications network (PCN) for increasing capacity for communications in a mobile radio cellular system environment.

Another object of the invention is to provide a PCN system which can be used at the same frequencies as used for the mobile radio cellular systems.

An additional object of the invention is to provide a PCN system which can be used concurrently with a mobile cellular system without interfering with the mobile cellular system.

A further object of the invention is a PCN system which allows communications between base users and PCN users with spread spectrum.

A still further object of the invention is a PCN system which can overlay geographically and overlay in spectrum, on an already existing mobile cellular system, without modifications the mobile cellular system.

SUMMARY OF THE INVENTION

According to the present invention, as embodied and broadly described herein, a spread spectrum CDMA communications system for communicating data between a plurality of PCN users is provided comprising a plurality of PCN-base stations and a plurality of PCN units. The PCN users communicate through the PCN-base station. Data may be, but are not limited to, computer data, facsimile data or digitized voice.

The spread spectrum CDMA communications system is located within a same geographical region, i.e. cell, as occupied by a mobile cellular system. Typically, the cellular-base station and the PCN-base station are collocated. Each cell of the mobile cellular system has a cellular bandwidth. Typically, the cellular bandwidth is 12.5 MHz. The cellular bandwidth is divided into a plurality of predetermined channels. The predetermined channels are separated by guard bands. The mobile cellular system has cellular users communicating on the predetermined channels.

A plurality of PCN-base stations overlay the same geographical region as occupied by the mobile cellular system. A PCN-base station communicates data between the plurality of PCN users. A PCN user uses a PCN unit.

Each PCN-base station has base-converting means, base-product-processing means, base-transmitting means, a base antenna, base-comb-filter means and base-detection means. The base-converting means converts the format of the data to be transmitted to a PCN user into a form suitable for communicating over radio waves. The base-product-processing means processes the data with spread spectrum modulation. The base-transmitting means transmits across the cellular bandwidth, from the PCN-base station to a PCN unit, the spread-spectrum-processed-converted data. The base-comb-filter means filters, or attenuates, i.e., notch-cut, the predetermined channels of the mobile cellular system. The base-detection means is coupled through the base-comb-filter means to the base antenna. The base-detection means recovers data communicated from the PCN unit to the PCN-base station.

The plurality of PCN units are located in the cell. Each of the PCN units has a PCN antenna and PCN detection means. The PCN-detection means recovers data communicated from the PCN-base station. For communicating to the PCN-base station, the PCN unit has PCN-converting means, PCN-product-processing means and PCN-transmitting means. The PCN-converting means converts the format of data from a PCN user into a form suitable for communicating over radio waves. The PCN-product-processing means processes the data with spread spectrum modulation. The PCN-transmitting means transmits across the cellular bandwidth, the spread spectrum processed converted data from the PCN unit to a PCN-base station.

Additional objects and advantages of the invention will be set forth in part in the description which follows, and in Dart will be obvious from the description, or may be learned by practice of the invention. The objects and advantages of the invention also may be realized and attained by means of the instrumentalities and combinations particularly pointed out in the appended claims.

DESCRIPTION OF THE DRAWINGS

The accompanying drawings, which are incorporated in and constitute a part of the specification, illustrate preferred embodiments of the invention, and together with the description serve to explain the principles of the invention.

FIG. 9 shows a spread spectrum data signal when the spread spectrum signal power is equal to an AM signal power;

FIG. 10 shows an audio signal when the spread spectrum signal power is equal to the AM signal power;

FIG. 12 shows position settings of switches of FIG. 11 to form PN sequences.

DETAILED DESCRIPTION OF THE PREFERRED EMBODIMENTS

Figure 1:
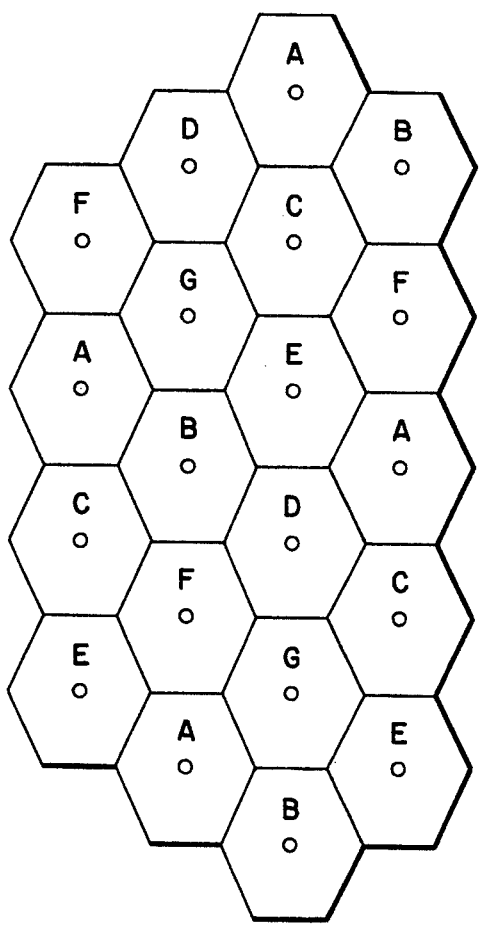
FIG. 1 illustrates a seven-frequency-set mobile cellular plan.
Figure 2:
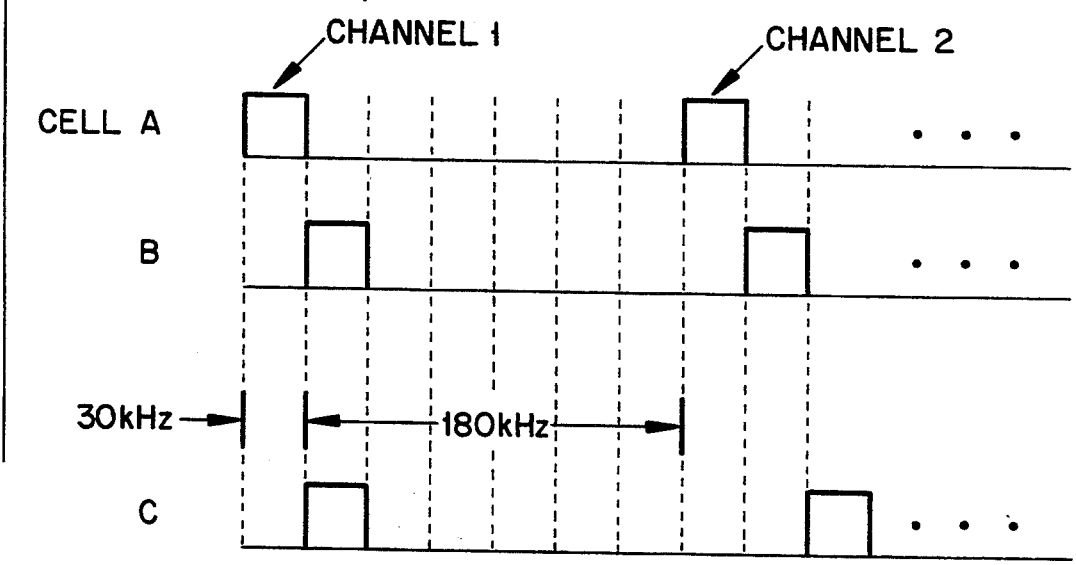
FIG. 2 shows cellular channels which are separated by a guard band of 180 kHz.
Figure 3A:
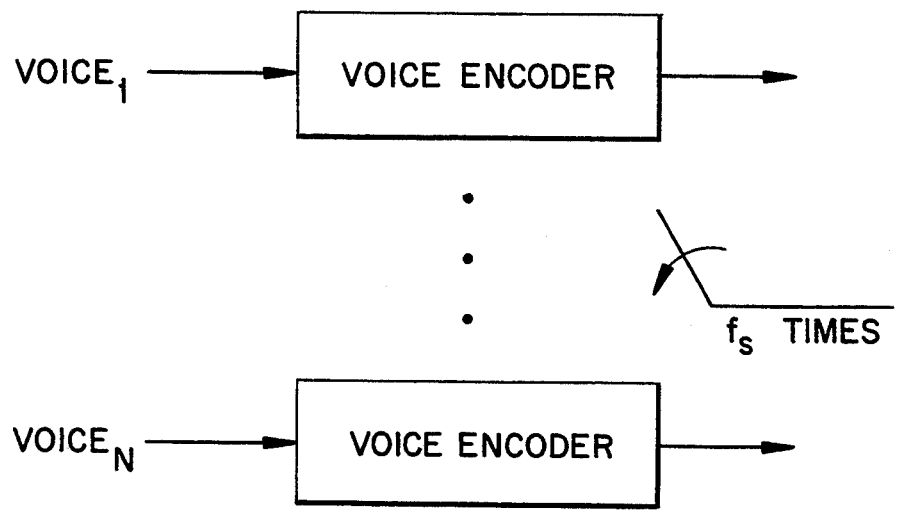
FIG. 3A illustrates polling of users by time division multiple access.
Figure 3B:
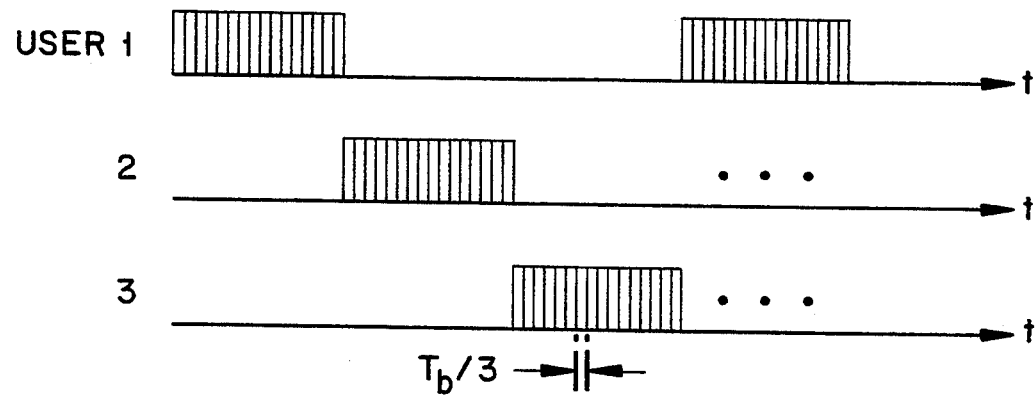
FIG. 3B illustrates user time allocation by time division multiple access.

Reference will now be made in detail to the present preferred embodiments of the invention, examples of which are illustrated in the accompanying drawings, wherein like reference numerals indicate like elements throughout the several views.

The spread spectrum CDMA communications system of the present invention is located within a same geographical region, i.e. cell, as occupied by a mobile cellular system. Each cell of the mobile cellular system has a cellular bandwidth. In presently deployed mobile cellular systems, the cellular bandwidth is 12.5 MHz. The cellular bandwidth is divided into a plurality of predetermined channels. Each predetermined channel typically has a bandwidth of 30 kHz. The predetermined channels are separated by guard bands. The usual guard band separation is 180 kHz. Cellular users communicate on the predetermined channels, currently using FM.

The spread spectrum CDMA communications system includes a plurality of PCN-base stations and a plurality of PCN units located within the same geographical region, i.e. cell, as occupied by the mobile cellular system. The spread spectrum CDMA communications system can be used for communicating data between a plurality of PCN users. The data may be, but are not limited to, computer data, facsimile data or digitized voice.

A PCN-base station, which is preferably collocated geographically with a cellular-base station, communicates data between the plurality of PCN users. A first PCN user uses a first PCN unit, and a second PCN user uses a second PCN unit.

Each PCN-base station includes base-converting means, base-product-processing means, base-transmitting means, base-comb-filter means, base-detection means and a base antenna. The base-comb-filter means may include notch filters which attenuate the mobile cellular signal power transmitted on predetermined channels of the mobile cellular system. The base-detection means may include base-spread-spectrum-processing means and base-synchronizing means. The base-detection means broadly converts data communicated from a PCN unit into a form suitable for a user.

Figure 4:
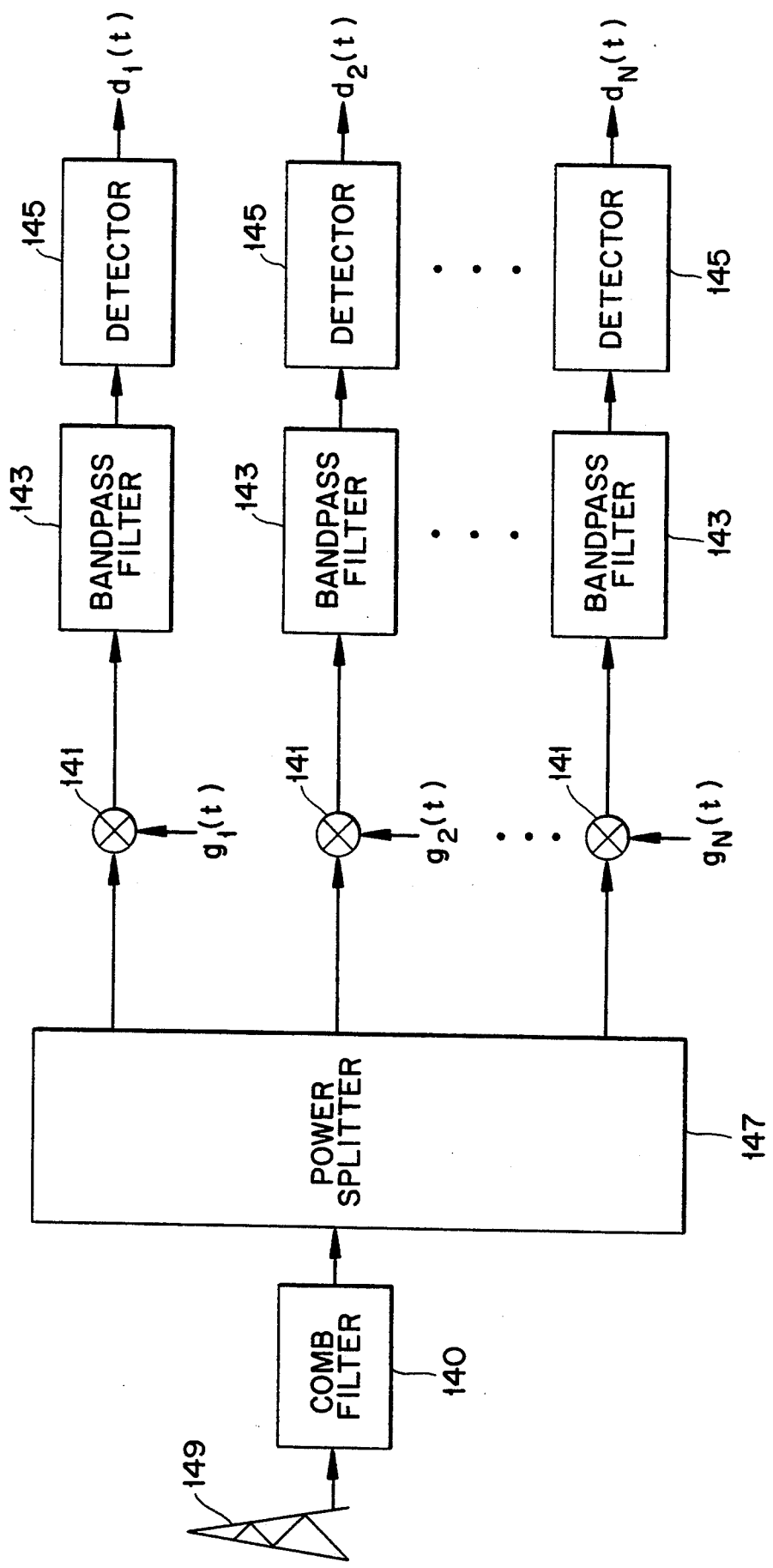
FIG. 4 is a block diagram of a PCN-base station receiver.

The base-comb-filter means, as shown in FIG. 4, may be embodied as a comb filter 140. The comb filter 140 notches the predetermined channels of the mobile cellular system. The comb filter 140 is necessary in order to reduce the combined interfering power level from mobile cellular users with the PCN-base station. For the presently deployed mobile cellular system, by way of example, the comb filter 140 would serve as a plurality of notch filters, blocking the 30 kHz bandwidth at each frequency location of the predetermined channels of the mobile cellular system.

The base-spread-spectrum-processing means, as illustrated in FIG. 4, may be embodied as a pseudorandom generator, product device 141 and bandpass filter 143. The pseudorandom generator stores chip codes, $g_1(t)$, $g_2(t)$, ..., $g_N(t)$, for demodulating data from spread spectrum signals received from the plurality of PCN units at the PCN-base station. The base-detection means also includes means for synchronizing the base-spread-spectrum-processing means to received spread spectrum signals.

The base-spread-spectrum-processing means at the PCN-base station processes selected data received from a selected PCN unit, which were transmitted with a spread spectrum signal using a selected-chip code, $g_i(t)$. The detector 145 demodulates the selected data from the despread spread-spectrum signal.

A plurality of product devices 141, bandpass filters 143 and detectors 145 may be coupled through a power splitter 147 to an antenna 149, for receiving simultaneously multiple spread-spectrum channels. Each product device 141 would use a selected chip code for demodulating a selected spread spectrum signal, respectively.

For a spread spectrum system to operate properly, the spread spectrum receiver must acquire the correct phase position of the received spread spectral signal, and the receiver must continually track that phase position so that loss-of-lock will not occur. The two processes of acquisition and tracking form the synchronization subsystem of a spread spectrum receiver. The former operation is typically accomplished by a search of as many phase positions as necessary until one phase position is found which results in a large correlation between the phase of the incoming signal and the phase of the locally generated spreading sequence at the receiver. This former process occurs using correlator means or matched filter means. The latter operation is often performed with a "delay-locked loop". The importance of the combined synchronization process cannot be overstated for if synchronization is not both achieved and maintained, the desired signal cannot be despread.

Figure 5A:
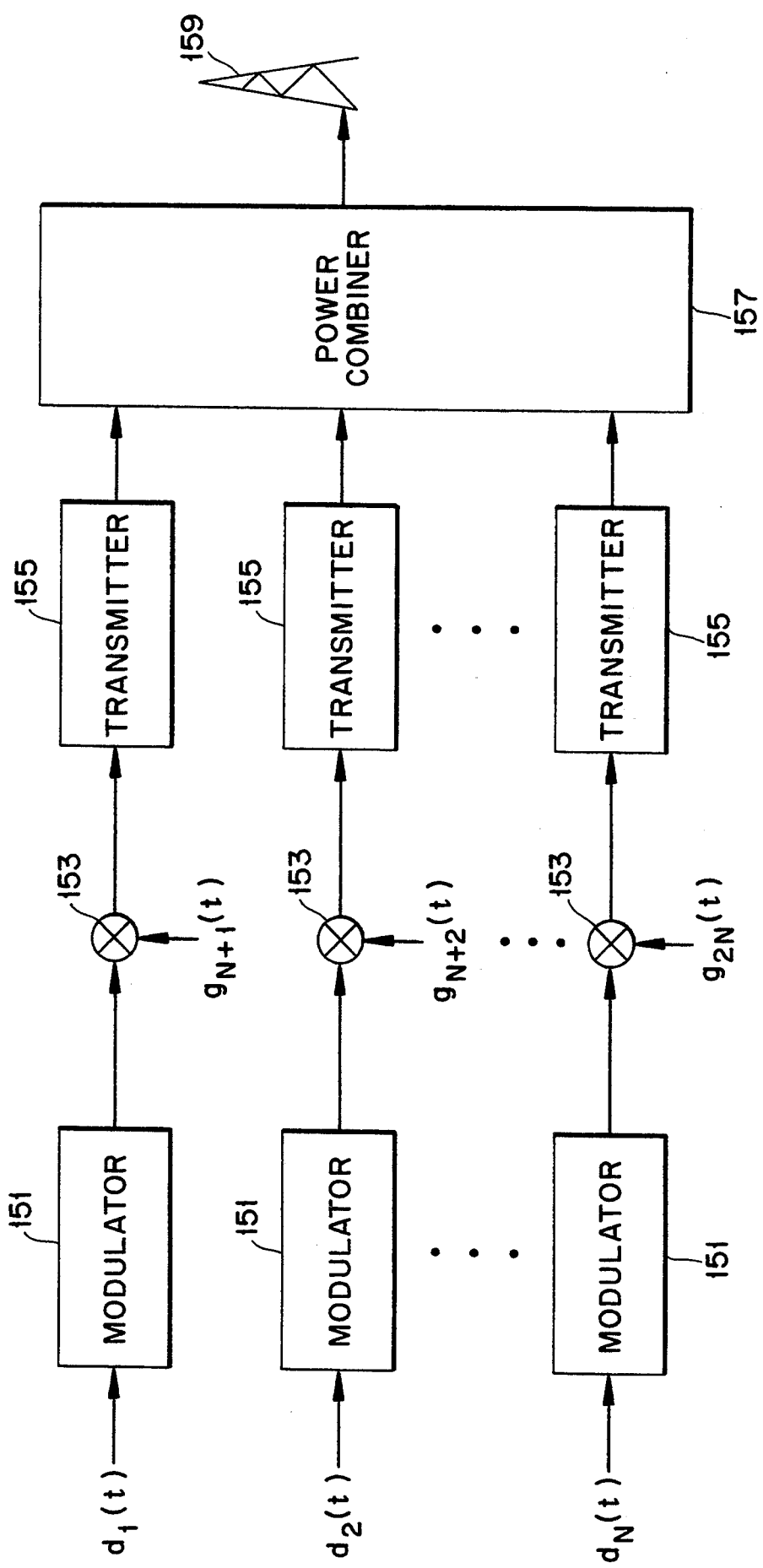
FIG. 5A is a block diagram of a first embodiment of a PCN-base station transmitter.

The base-converting means, as illustrated in FIG. 5A, may be embodied as a base modulator 151. The base modulator 151 converts the format of data to be transmitted to a PCN user into a form suitable for communicating over radio waves. For example, an analog voice signal may be converted to a base-data signal, using a technique called source encoding. Typical source coders are linear predictive coders, vocoders, delta modulators and pulse code modulation coders.

The base-product-processing means may be embodied as a base-spread-spectrum modulator 153. The base-spread-spectrum modulator 153 is coupled to the base modulator 151. The base-spread-spectrum modulator 153 modulates the converted-data signal using spread spectrum. The converted data is multiplied using a product device or is modulo-2 added, using an exclusive OR gate 153 with a selected spread-spectrum chip code, $g_{N+i}(t)$.

The base-transmitting means may be embodied as a base transmitter 155. The base transmitter 155 is coupled to the base-spread-spectrum modulator 153. The base transmitter 155 transmits across the cellular bandwidth, the spread-spectrum-processed-converted data from the PCN-base station to a PCN unit. The base transmitter 155 includes modulating the spread-spectrum-processed-converted data at a carrier frequency, $f_0$.

The base-transmitter 155 has a transmitter oscillator which supplies a carrier signal having a carrier frequency. The transmitter oscillator is coupled to a transmitter-product device. The transmitter multiplies, using the transmitter-product device, the spread-spectrum-processed-converted data by the carrier signal.

The base transmitting means may, in a preferred embodiment, transmit data using a spread spectrum signal having a power level limited to a predetermined level.

The base transmitting means may also transmit data by adding the plurality of spread spectrum data signals.

A plurality of modulators 151, product devices 153 and transmitters 155 may be coupled through a power combiner 157 to an antenna 159 for simultaneously transmitting a multiplicity of spread-spectrum channels. FIG. 5A is an illustrative embodiment for generating simultaneous spread spectrum signals, and there are many variants for interconnecting product devices, modulators and transmitters, for accomplishing the same functions.

Figure 5B:
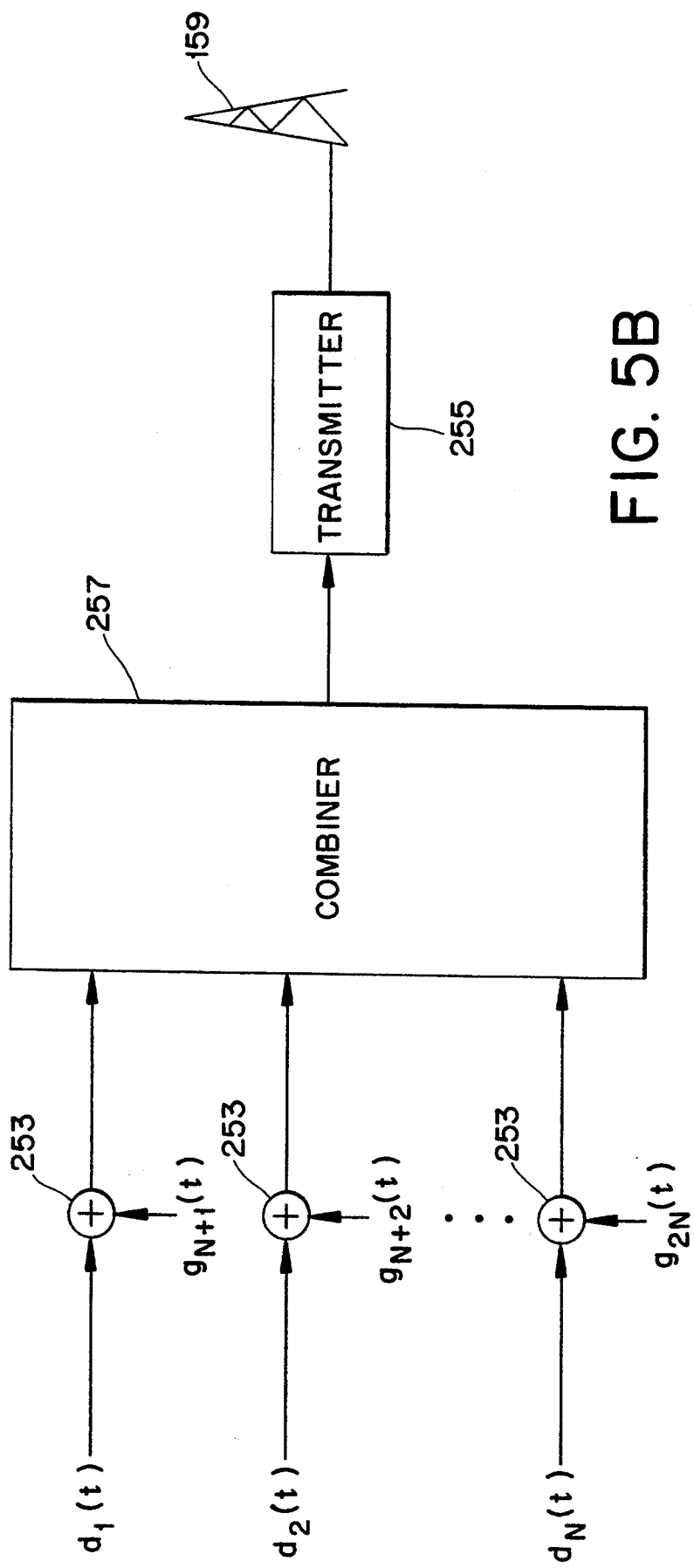
FIG. 5B is a block diagram of a second embodiment of a PCN-base station transmitter.

As an alternative example, FIG. 5B illustrates a PCN-base station transmitter which may be used for producing the same result as the transmitter of FIG. 5A. In FIG. 5B data are modulo-2 added, using exclusive OR gates 253 with a selected spread-spectrum chip code, $g_{N+i}(t)$. The resulting spread-spectrum-processed data from a plurality of exclusive OR gates 253 are combined using combiner 257. The base-transmitter 255 modulates the combined spread-spectrum-processed data at the carrier frequency, $f_0$. The transmitter 255 is coupled to the antenna 159 and simultaneously transmits the plurality of spread-spectrum-processed data as a multiplicity of spread-spectrum channels.

The present invention also includes PCN units which are located within the cell. Each of the PCN units has a PCN-antenna, PCN-detection means, PCN-converting means, PCN-product-processing means and PCN-transmitting means. The PCN-detection means is coupled to the PCN-antenna. The PCN-detection means includes PCN-spread-spectrum-processing means.

Figure 6:
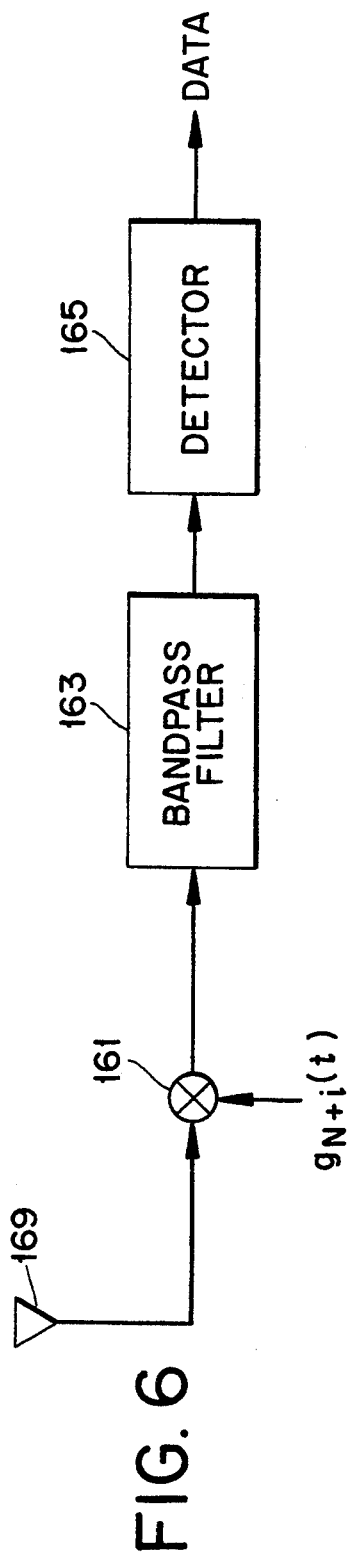
FIG. 6 is a block diagram of a PCN-unit receiver.

The PCN-detection means recovers data communicated to the PCN unit from the PCN-base station. The PCN-detection means also includes means for converting the format of the data into a form suitable for a user. The format may be, for example, computer data, an analog speech signal or other information. The PCN-detection means, by way of example, may include tracking and acquisition circuits for the spread spectrum signal, a product device for despreading the spread spectrum signal, and an envelope detector. FIG. 6 illustratively shows PCN-detection means embodied as a PCN spread-spectrum demodulator 161, PCN-bandpass filter 163, and PCN-data detector 165, coupled to a PCN-antenna 169.

The PCN-spread-spectrum demodulator 161 despreads using a chip-code signal having the same selected chip code, $g_{N+i}(t)$, as the received spread-spectrum signal, the spread-spectrum signal received from the PCN-base station. The PCN-bandpass filter 163 filters the despread signal and the PCN-data detector 165 puts the format of the despread spread-spectrum signal into a form suitable for a PCN user.

The PCN-spread-spectrum-processing means includes means for storing a local chip code, $g_{N+i}(t)$, for comparing the local chip code to signals received for recovering data sent from the PCN-base station to the PCN unit.

The PCN-spread-spectrum-processing means also may include means for synchronizing the PCN-spread-spectrum-processing means to received signals. Similarly, the PCN-spread-spectrum-processing means at the PCN-base station includes means for processing data for particular PCN units with a selected chip code.

Figure 7A:
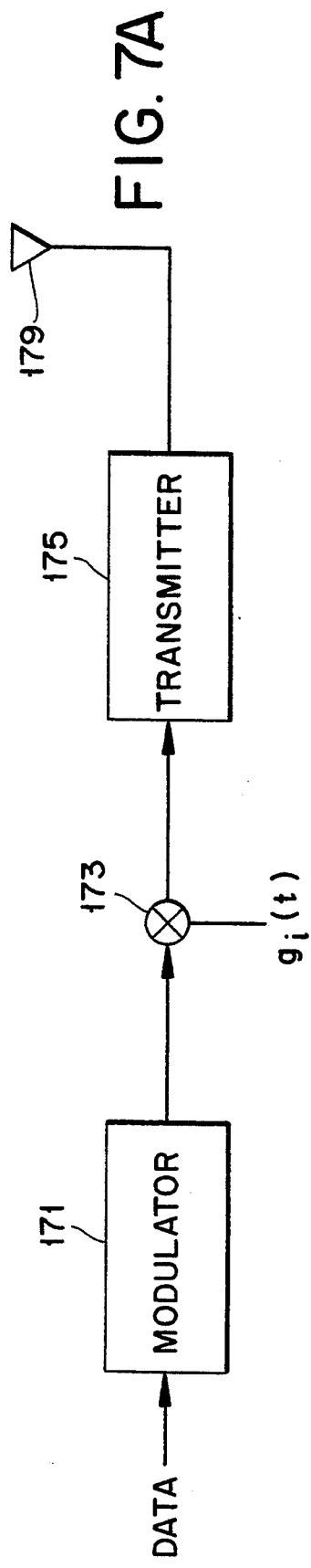
FIG. 7A is a block diagram of a first embodiment of PCN-unit transmitter.

The PCN-converting means, as illustrated in FIG. 7A, may be embodied as a PCN modulator 171. The PCN modulator 171 converts the format of the data into a form suitable for communicating over radio waves.

Similar to the PCN-base station, an analog voice signal may be converted to a converted-data signal, using a technique called source encoding. As with the base modulator 151, typical source encoders are linear predictive coders, vocoders, delta modulators and pulse code modulation.

The PCN-spread-spectrum-processing means may be embodied as a PCN-spread-spectrum modulator 173. The PCN-spread-spectrum modulator 173 is coupled to the PCN modulator 171. The PCN-spread-spectrum modulator 173 modulates the converted-data signal with a selected chip code, $g_i(t)$. The converted-data signal is multiplied using a product device is or modulo-2 added, using an exclusive OR gate 173 with the selected chip code, $g_i(t)$.

Figure 7B:
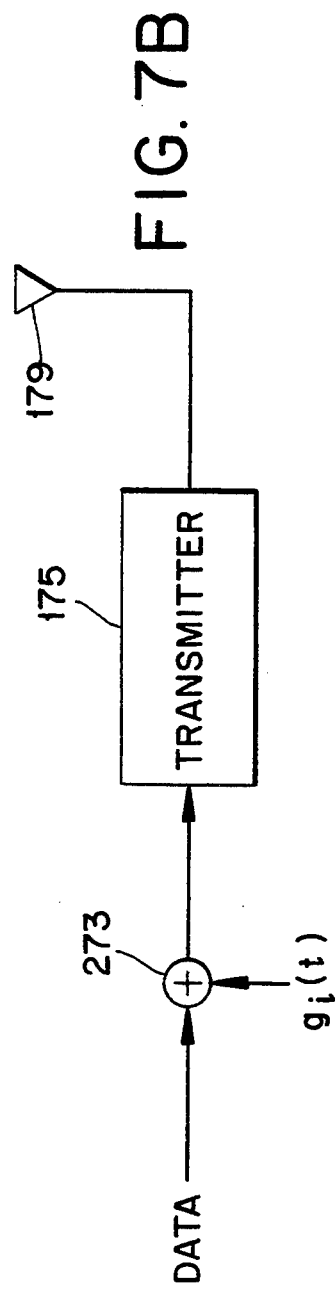
FIG. 7B is a block diagram of a second embodiment of a PCN unit transmitter.

As an equivalent transmitter, FIG. 7B illustrates a transmitter for a PCN unit having PCN-spread-spectrum-processing means as a PCN modulo-2 adder, embodied as an exclusive OR gate 273. The exclusive OR gate 273 modulo-2 adds the converted data signal with the selected chip code, $g_i(t)$.

The PCN-transmitting means in FIGS. 7A and 7B may be embodied as a PCN transmitter 175. The PCN transmitter 175 is coupled between the PCN-spread-spectrum modulator 173 and PCN antenna 179. The PCN transmitter 175 transmits across the cellular bandwidth, the spread-spectrum-processed-converted data from the PCN unit to the PCN-base station. The PCN transmitter 175 modulates the spread-spectrum-processed-converted data at a carrier frequency, $f_o$. The carrier frequency of the PCN transmitter and the cell transmitter may be at the same or at different frequencies.

A key to the present invention is that the spread spectrum signals are designed to be "transparent" to other users, i.e., spread spectrum signals are designed to provide negligible interference to the communication of other, existing users. The presence of a spread spectrum signal is difficult to determine. This characteristic is known as low probability of interception (LPI) and low probability of detection (LPD). The LPI and LPD features of spread spectrum allow transmission between users of a spread spectrum CDMA communications system without the existing users of the mobile cellular system experiencing significant interference. The present invention makes use of LPI and LPD with respect to the predetermined channels using FM in a mobile cellular system. By having the power level of each spread spectrum signal below the predetermined level, the total power from all spread spectrum used within a cell does not interfere with users in the mobile cellular system.

Spread spectrum is also "jam" or interference resistant. A spread spectrum receiver spreads the spectrum of the interfering signal. This reduces the interference from the interfering signal so that it does not noticeably degrade performance of the spread spectrum system. This feature of interference reduction makes spread spectrum useful for commercial communication, i.e., the spread spectrum waveforms can be overlaid on top of existing narrowband signals.

The present invention employs direct sequence spread spectrum, which uses a phase modulation technique. Direct sequence spread spectrum takes the power that is to be transmitted and spreads it over a very wide bandwidth so that the power per unit bandwidth (watts/hertz) is minimized. When this is accomplished, the transmitted spread spectrum power received by a mobile cellular user, having a relatively narrow bandwidth, is only a small fraction of the actual transmitted power.

In a mobile cellular system, by way of example, if a spread spectrum signal having a power of 10 milliwatts is spread over a cellular bandwidth of 12.5 MHz and a cellular user employs a communication system having a channel bandwidth of only 30 kHz, then the effective interfering power due to one spread spectrum signal, in the narrow band communication system, is reduced by the factor of 12.5 MHz/30kHz which is approximately 400. Thus, the effective interfering power is 10 milliwatts divided by 400 or 0.025 mW. For fifty concurrent users of spread spectrum, the power of the interfering signal due to spread spectrum is increased by fifty to a peak interfering power of 1.25 mW.

The feature of spread spectrum that results in interference reduction is that the spread spectrum receiver actually spreads the received energy of any interferer over the same wide bandwidth, 12.5 MHz in the present example, while compressing the bandwidth of the desired received signal to its original bandwidth. For example, if the original bandwidth of the desired PCN data signal is only 30 kHz, then the power of the interfering signal produced by the cellular base station is reduced by 12.5 MHz/30kHz which is approximately 400.

Direct sequence spread spectrum achieves a spreading of the spectrum by modulating the original signal with a very wideband signal relative to the data bandwidth. This wideband signal is chosen to have two possible amplitudes, +1 and −1, and these amplitudes are switched, in a "pseudo-random" manner, periodically. Thus, at each equally spaced time interval, a decision is made as to whether the wideband modulating signal should be +1 or −1. If a coin were tossed to make such a decision, the resulting sequence would be truly random. However, in such a case, the receiver would not know the sequence a-priori and could not properly receive the transmission. Instead, a chip-code generator generates electronically an approximately random sequence, called a pseudo-random sequence, which is known a-priori to both the transmitter and the receiver.

To illustrate the characteristics of spread spectrum, consider 4800 bps data which are binary phase-shift keyed (BPSK) modulated. The resulting signal bandwidth is approximately 9.6 kHz. This bandwidth is then spread using direct sequence spread spectrum to 16 MHz. Thus, the processing gain, N, is approximately 1600 or 32 dB.

Alternatively, consider a more typical implementation with 4800 bps data which is modulo-2 added to a spread-spectrum-chip-code signal, $g_i(t)$, having a chip rate of 8 Mchips/sec. The resulting spread-spectrum data are binary/phase-shift keyed (BPSK) modulated. The resulting spread-spectrum bandwidth is 16 MHz. Thus, the processing gain is: $N=(8 \times 10^6)/(4.8 \times 10^3)$, which approximately equals 1600, or 32db.

Figure 8:
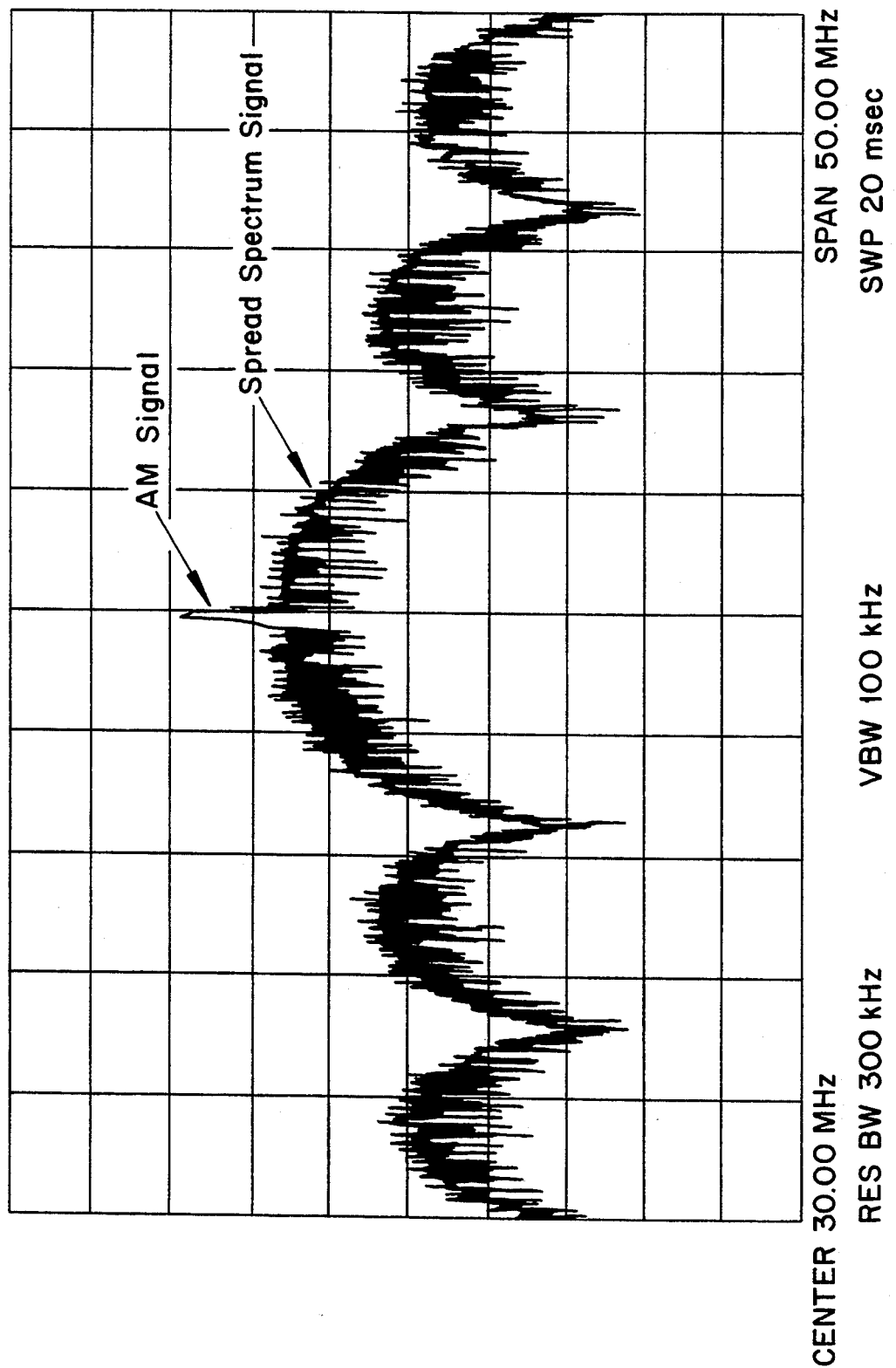
FIG. 8 shows the spectrum of a spread spectrum signal with an AM signal of equal power at its carrier frequency.

FIG. 8 shows the spectrum of this spread spectrum signal on an amplitude modulated 3 kHz sinusoidal signal, when they each have the same power level. The bandwidth of the AM waveform is 6 kHz. Both waveforms have the same carrier frequency.

FIG. 9 shows the demodulated square-wave data stream. This waveform has been processed by an "integrator" in the receiver, hence the triangular shaped waveform. Note that positive and negative peak voltages representing a 1-bit and 0-bit are clearly shown. FIG. 10 shows that the demodulated AM signal replicates the 3 kHz sine wave.

The AM signal does not degrade the reception of data because the spread spectrum receiver spreads the energy of the AM signal over 16 MHz, while compressing the spread spectrum signal back to its original 9.6 kHz bandwidth. The amount of the spread AM energy in the 9.6 kHz BPSK bandwidth is the original energy divided by N=1600 (or, equivalently, it is reduced by 32 dB). Since both waveforms initially were of equal power, the signal-to-noise ratio is now 32 dB, which is sufficient to obtain a very low error rate.

The spread spectrum signal does not interfere with the AM waveform because the spread spectrum power in the bandwidth of the AM signal is the original power in the spread spectrum signal divided by $N_1$, where $$N_1 = \frac{16 \text{ MHz}}{6 \text{ kHz}} = 2670 \text{ (or 33 dB)}$$

hence the signal-to-interference ratio of the demodulated sine wave is 33 dB.

Figure 11:
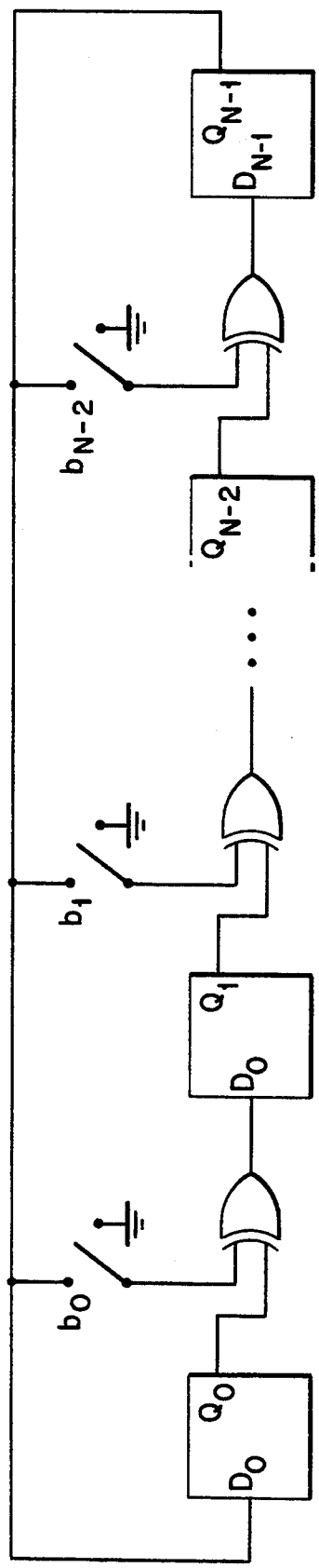
FIG. 11 shows a pseudo-random sequence generator.

The direct sequence modes of spread spectrum uses pseudo random sequences to generate the spreading sequence. While there are many different possible sequences, the most commonly used are "maximal-length" linear shift register sequences, often referred to as pseudo noise (PN) sequences. FIG. 11 shows a typical shift register sequence generator. FIG. 12 indicates the position of each switch $b_i$ to form a PN sequence of length L, where $$L = 2^N - 1$$

The characteristics of these sequences are indeed "noise like". To see this, if the spreading sequence is properly designed, it will have many of the randomness properties of a fair coin toss experiment where "1"=heads and "−1"=tails. These properties include the following:

1) In a long sequence, about ½ the chips will be +1 and ½ will be −1.
2) The length of a run of r chips of the same sign will occur about $L/2^r$ times in a sequence of L chips.
3) The autocorrelation of the sequence $PN_i(t)$ and $PN_i(t+t')$ is very small except in the vicinity of $t'=0$.
4) The cross-correlation of any two sequences $PN_i(t)$ and $PN_j(t+t')$ is small.

Code Division Multiple Access

Code division multiple access (CDMA) is a direct sequence spread spectrum system in which a number, at least two, of spread-spectrum signals communicate simultaneously, each operating over the same frequency band. In a CDMA system, each user is given a distinct chip code. This chip code identifies the user. For example, if a first user has a first chip code, $g_1(t)$, and a second user a second chip code, $g_2(t)$, etc., then a receiver, desiring to listen to the first user, receives at its antenna all of the energy sent by all of the users. However, after despreading the first user's signal, the receiver outputs all the energy of the first user but only a small fraction of the energies sent by the second, third, etc., users.

CDMA is interference limited. That is, the number of users; that can use the same spectrum and still have acceptable performance is determined by the total interference power that all of the users, taken as a whole, generate in the receiver. Unless one takes great care in power control, those CDMA transmitters which are close to the receiver will cause the overwhelming interference. This effect is known as the "near-far" problem. In a mobile environment the near-far problem could be the dominant effect. Controlling the power of each individual mobile user is possible so that the received power from each mobile user is the same. This technique is called "adaptive power control". See U.S. Patent Application having Filing Date of Nov. 16, 1990, entitled, "Adaptive Power Control Receiver," by Donald L. Schilling, which is incorporated herein by reference.

It has been proposed to set aside 10% of the mobile cellular bandwidth, or 1.25 MHz, to employ CDMA. This procedure would eliminate 10% of the currently existing mobile cellular channels, which is approximately 5 channels, thereby restricting the use and access of present subscribers to the mobile cellular system. Further, such a procedure will disrupt current service as the base station of each cell must be modified.

As a result of this procedure, the existing users are penalized, since the number of available channels are reduced by 10% and a cellular company employing this approach must modify each cell by first eliminating those channels from use and then installing the new CDMA equipment.

The present invention is for a CDMA system which will not affect existing users in so far as it does not require that 10% of the band be set aside. Indeed, using this invention, an entirely separate CDMA system can be inserted into the existing mobile spectrum without affecting the existing operation of the FDMA mobile cellular system or the forthcoming TDMA system.

The Proposal PCN Spread Spectrum CDMA System

The PCN spread spectrum communications system of the present invention is a CDMA system. Spread spectrum Code Division Multiple Access (CDMA) can significantly increase the number of users per cell, compared to TDMA. With CDMA, each user in a cell uses the same frequency band. However, each PCN CDMA signal has a separate pseudo random code which enables a receiver to distinguish a desired signal from the remaining signals. PCN users in adjacent cells use the same frequency band and the same bandwidth, and therefore "interfere" with one another. A received signal may appear somewhat noisier as the number of users' signals received by a PCN base station increases.

Each unwanted user's signal generates some interfering power whose magnitude depends on the processing gain. PCN users in adjacent cells increase the expected interfering energy compared to PCN users within a particular cell by about 50%, assuming that the PCN users are uniformly distributed throughout the adjacent cells. Since the interference increase factor is not severe, frequency reuse is not employed. Each spread spectrum cell can use a full 12.5 MHz band for transmission and a full 12.5 MHz band for reception. Hence, using a chip rate of six million chips per second and a coding data rate of 4800 bps results in approximately a processing gain of 1250 chips per bit. It is well known to those skilled in the art that the number of PCN CDMA users is approximately equal to the processing gain. Thus, up to 1250 users can operate in the 12.5 MHz bandwidth of the mobile cellular system.

To ensure that the PCN system does not degrade the performance of the mobile cellular system, note that the currently existing FDMA system requires a signal-to-noise ratio (SNR) of 17 dB. The proposal TDMA system will require a signal-to-noise ratio of 7 dB. The PCN CDMA system requires an SNR of 4 dB. The PCN user is not allowed to significantly interfere with the mobile cellular system. The power transmitted by a mobile cellular user, $P_{CELL}=0.5$ watts. The power transmitted by a PCN user, $P_{PCN}=10$ milliwatt. Assume that the mobile cellular users and the PCN users employ adaptive power control so that at the cellular-base station and the PCN-base station, the received power levels are proportionally the same. Four links must be examined in order to assess system performance: the effect of the PCN-base station on the cellular user; the effect of the cellular-base station on the PCN user; the effect of the PCN user on the cellular-base station; and the effect of the cellular user on the PCN-base station. For the following analysis, assume that the PCN-base station and the cellular-base station are collocated and have the same transmitter power, e.g., 10 Watts.

Consider the effect of the PCN-base station on a cellular user. The power of the spread-spectrum signal from the PCN-base station is spread over 12.5 MHz. The cellular user, however, communicates on a predetermined channel using FM, which has a bandwidth of approximately 30 kHz. Thus, the cellular usher has an effective processing gain with respect to the spread-spectrum signal from the PCN-base station of approximately 400, or 26 dB. The 26 dB means that the power level of the spread-spectrum signal from the PCN-base station is reduced at the cellular user by 400. Assuming that the PCN-base station and cellular-base station each have a transmitter power level of 10 watts, the processing gain yields an acceptable signal-to-interference ratio at the cellular user, i.e., much higher then the required 17 dB.

The effect of the cellular-base station on the PCN user is as follows: The spread-spectrum signal from the PCN-base station is spread by the chip rate of 6.25 megachips per second. The data rate of the data in the spread-spectrum signal is 4,800 bits per second. Thus, the processing gain at the PCN user is 6.25 megachips per second divided by 4,800 bits per second, which approximately equals 1,250, or approximately 31 dB. Assuming the PCN-base station and the cellular-base station each have a transmitter power of 10 Watts, this processing gain yields an acceptable signal-to-interference ratio at the PCN user, i.e., 31 dB.

Consider the effect of PCN users on the receiver at the cellular-base station. Assume, for ease of calculations, that users of the mobile cellular system and users of the PCN system employ adaptive power control. The cellular user transmits a power, $P_{CELL}=0.5W$, and the PCN user transmits a power $P_{PCN}=10mW$. Each cell of a mobile cellular system is assumed to have 50 cellular users, and the PCN system is assumed to have K users. The interference to the receiver of the cellular-based station is N times $P_{PCN}$ divided by the processing gain. As shown before the processing gain is $N=12.5$ MHz /30kHz=400 or 26 dB. Thus, the signal-to-interference ratio is $NP_{CELL}/(K \times P_{PCN})=400(\frac{1}{2})/K(0.01)=2\times 10^4/K$. Assuming 200 PCN users (K=200), yields a signal-to-interference ratio of 20 dB, which exceeds the 17 dB signal to interfere ratio required for the FDMA used today and greatly exceeds the 7 dB signal-to-interference ratio needed in the projected TDMA system. The presently deployed mobile cellular system typically has $P_{CELL}=500$ milliwatts for hand held telephones and $P_{CELL}$ equals one watt for automobile located telephones. Thus, the foregoing analysis requires that the PCN user transmits a power level of ten milliwatts, $P_{PCN}=10$ mW.

Consider the effect of the foregoing power levels on the PCN-base station. The PCN-base station receives an interfering power level from 50 cellular users, of 50 times one Watt. With a processing gain for the PCN system of $N=1250$, a signal-to-interference ratio results at the PCN-base station of $S/I=(10$ mW $\times 1250)/(1W \times 50)$, yielding $S/I=\frac{1}{4}$ which is $-6$ dB. The receiver at the PCN-base station requires a signal to noise ratio of 4 dB. The required SNR can be realized at the PCN-base station with a band reject filter for notching out the signals from the cellular users in the 30 kHz predetermined channels. With a properly designed comb-notch filter, a 20 dB to 30 db signal-to-interference ratio can readily be achieved.

Figure 13:
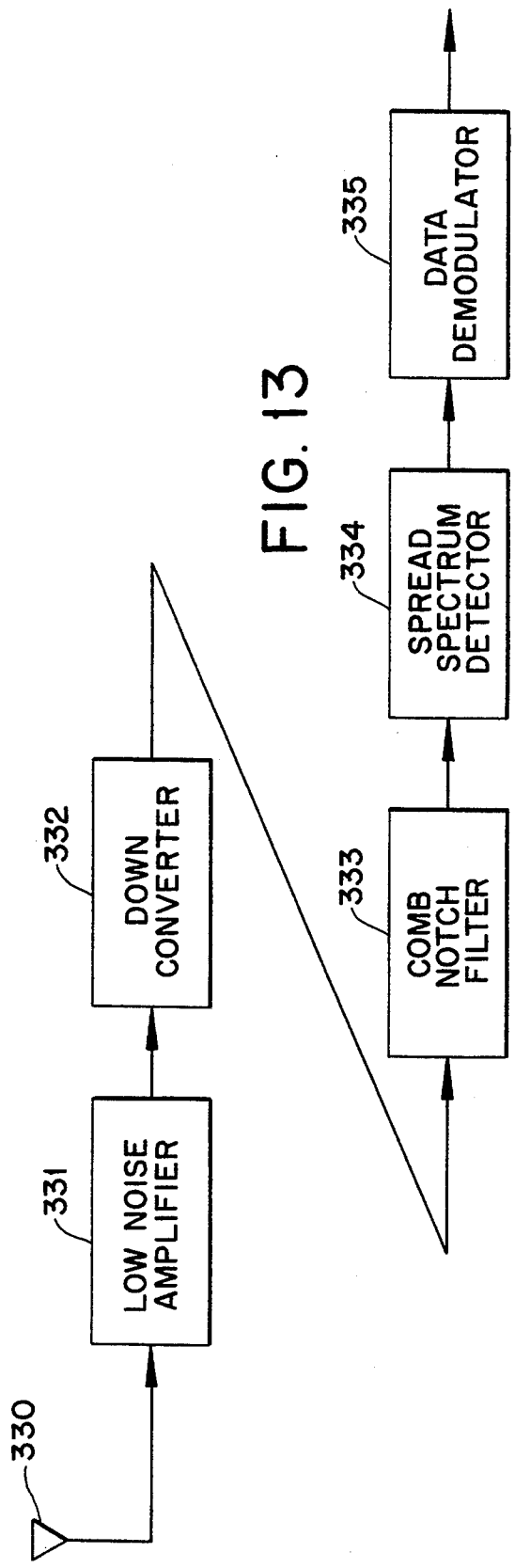
FIG. 13 illustrates the use of a comb filter.

FIG. 13 illustrates a comb-notch filter 333 inserted in a receiver of a PCN-base station. The receiver includes a low noise amplifier 331 coupled between the antenna 330 and a down converter 332. The comb-notch filter 333 is coupled between the down converter 332 and spread-spectrum demodulator 334. A demodulator 335 is coupled to the spread-spectrum demodulator 334. The comb-notch filter 333 in this illustrative example operates at an intermediate frequency and removes interference from the mobile cellular system.

From the foregoing analysis, a person of skill in the art recognizes that the present invention will allow a spread-spectrum CDMA system to overlay on a pre-existing FDMA mobile cellular system, without modification to the pre-existing mobile cellular system. The present invention allows frequency reuse of the already allocated frequency spectrum to the mobile cellular system. At the same time performance of the mobile cellular system is not degraded. The PCN system may add an increase of 200 PCN users over the 50 cellular users. The present system performance calculations are considered conservative, and an increase in PCN users may be greater than the estimated 200.

It will be apparent to those skilled in the art that various modifications can be made to the spread spectrum CDMA communications system of the instant invention without departing from the scope or spirit of the invention, and it is intended that the present invention cover modifications and variations of the spread spectrum CDMA communications system provided they come in the scope of the appended claims and their equivalents.

I claim:

1. A spread spectrum CDMA communications system for communicating data, including digitized voice signals, between a plurality of PCN units, said spread spectrum communications system located within a same geographical region as occupied by a mobile cellular system with each cell of the mobile cellular system having a cellular bandwidth divided into predetermined channels and guard bands between the predetermined channels, and having cellular-users communicating on the predetermined channels, said spread spectrum CDMA communications system communicating on the predetermined channels, comprising:

a plurality of PCN-base stations located within the mobile cellular system for communicating data to the plurality of PCN units, each of said PCN-base stations including,
  base means for converting the format of the data into a form suitable for communicating over radio waves;
  base-product means for spread spectrum processing the data; and
  base means for transmitting across the cellular bandwidth, the spread spectrum processed converted data from the PCN-base station to a PCN unit;
a plurality of PCN units, each of said PCN units including,
  a PCN antenna; and
  PCN detection means coupled to said PCN antenna and including PCN-spread-spectrum-processing means, for recovering data communicated from said PCN-base station.

2. The spread spectrum communications system as set forth in claim 1 wherein said PCN detection means includes means for converting the format of the data into a form suitable for a user.

3. The spread spectrum communications system as set forth in claim 1 wherein said PCN-spread-spectrum--processing means includes means for storing a local chip code for comparison to signals received for recovering data sent from said PCN-base station to said PCN unit.

4. The spread spectrum communications system as set forth in claim 1 wherein said PCN-spread-spectrum-processing means includes means for synchronizing said PCN-spread-spectrum-processing means to received signals.

5. The spread spectrum communications system as set forth in claim 1 wherein said spectrum processing means at said PCN-base station includes means for processing data for particular PCN units with a selected chip code.

6. The spread spectrum communications system as set forth in claim 1 wherein said means for transmitting transmits data in a time division format.

7. A spread spectrum CDMA communications system for communicating data including digitized voice signals, between a plurality of PCN units, said spread spectrum communications system located within a same geographical region as occupied by a mobile cellular system with each cell of the mobile cellular system having a cellular bandwidth divided into predetermined channels and guard bands between the predetermined channels, and having cellular-users communicating on the predetermined channels, said spread spectrum CDMA communications system communicating on the predetermined channels, comprising:
  a plurality of PCN units, located within a same geographical region as occupied by a mobile cellular system for communicating data to a plurality of users, each of said PCN units including,
    PCN-product means for spread spectrum processing the data; and
    PCN means for transmitting across the cellular bandwidth, the spread spectrum processed converted data frown PCN unit to a PCN-base station;
  a PCN-base station including,
    a base antenna;
    base-comb means coupled to said base antenna for notch filtering the predetermined channels; and
    base detection means coupled to said base-comb means, said base-detection means including base-spread-spectrum-processing means, for recovering data communicated from said PCN unit.

8. The spread spectrum communications system as set forth in claim 7 wherein said base detection means includes means for converting the format of the data into a form suitable for a user.

9. The spread spectrum communications system as set forth in claim 7 wherein said base-spread-spectrum-processing means includes means for storing a local chip code for comparison to signals; received for recovering data sent from said PCN station unit to said PCN-base station.

10. The spread spectrum communications system as set forth in claim 7 wherein base-spread-spectrum-processing means includes means for synchronizing said base-spread-spectrum-processing means to received signals.

11. The spread spectrum communications system as set forth in claim 7 wherein said base-spread-spectrum-processing means at said PCN-base station includes means for processing data for particular PCN units with a selected-chip code.

12. The spread spectrum communications system as set forth in claim 7 wherein said means for transmitting transmits data in a time division format.

13. A spread-spectrum receiver for use with a PCN-base station of a spread spectrum CDMA communications system for communicating data including digitized voice signals, between a plurality of PCN units, said spread spectrum communications system located within a same geographical region as occupied by a mobile cellular system with each cell of the mobile cellular system having a cellular bandwidth divided into a plurality predetermined channels and guard bands between the predetermined channels, and having a plurality of cellular-users communicating on the predetermined channels, said spread-spectrum coma communications system communicating on the predetermined channels, said spread-spectrum receiver comprising:
  a base antenna;
  comb-filter means for notch filtering the predetermine channels; and
  base detection means for recovering data communicated from said plurality of PCN units.

14. The spread-spectrum reciever as set forth in in claim 13 wherein said comb filter means includes a notch filter having band rejection at the plurality of predetermined channels.

15. A method, using a spread spectrum CDMA communications system, for communicating data, including digitized voice signals, between a plurality of PCN units and a PCN-base station located with a same geographical region as occupied by a mobile cellular system with each cell of the mobile cellular system having a cellular bandwidth divided into predetermined channels and guard bands between the predetermined channels and having cellular-users communicating on the predetermined channels, said spread spectrum CDMA communications system communicating on the predetermined channels, said method comprising the steps of:
  converting the format of the data into a form suitable for communicating over radio waves;
  spread spectrum processing the data;

transmitting the spread spectrum processed converted data signal across the cellular bandwidth;

receiving the spread spectrum processed converted data signal; and recovering the data from the spread spectrum processed converted data signal.

16. The method as set forth in claim 15, wherein the step of recovering the data from the spread spectrum processed converted data signal includes converting the format of the recovered data into a form suitable for a user.

17. The method as set forth in claim 15, wherein the step of spread spectrum processing the converted data includes the steps of:

storing a local chip code;

comparing the local chip code to received signals; and recovering data sent from a PCN unit to a PCN-base station.

18. The method as set forth in claim 15, wherein the step of spread spectrum processing the converted data includes the steps of:

storing a local chip code;

comparing the local chip code to received signals; and recovering data sent from a PCN-base station to a PCN 19. The method as set forth in claim 15, wherein the step of spread spectrum processing the converted data includes synchronizing the spread spectrum processing of the converted data to received signals.

20. The method as set forth in claim 15, wherein the step of spread spectrum processing the converted data includes processing data for a particular PCN unit with a selected chip code.

21. The method as set forth in claim 15, wherein the step of transmitting includes transmitting the spectrum processed data in a time division format.

22. A method, using a spread spectrum receiver, for use with a PCN-base station of a spread spectrum CDMA communications system, for communicating data, including digitized voice signals, between a plurality of PCN units and a PCN-base station located with a same geographical region as occupied by a mobile cellular system with each cell of the mobile cellular system having a cellular bandwidth divided into predetermined channels and guard bands between the predetermined channels and having cellular-users communicating on the predetermined channels, said spread spectrum CDMA communications system communicating on the predetermined channels, said method comprising the steps of:

receiving the spread spectrum signals;

notch filtering the predetermined channels; and recovering the data from the spread spectrum signal.

23. The method as set forth in claim 22 wherein the notch filtering step includes notch filtering with band rejection at the plurality of predetermined channels.

* * * * *

UNITED STATES PATENT AND TRADEMARK OFFICE
CERTIFICATE OF CORRECTION

PATENT NO. : 5,351,269

DATED : September 27, 1994

INVENTOR(S) : Donald L. Schilling

It is certified that error appears in the above-identified patent and that said Letters Patent is hereby corrected as shown below:

```
Column 1, line  9:   after "existing" insert --FDMA,--.
Column 1, line 29:   before "mobile" insert --a--.
Column 1, line 30:   delete "hornier" and insert --border--.
Column 3, line 24:   delete "Dart" and insert --part--.
Column 7, line 13:   delete "device is or" and insert --device,
                     or is--.
Column 7, line 14:   delete "173" and insert --173,--.
Column 7, line 25:   delete "PCN antenna" and insert
                     --PCN-antenna--.
Column 9, line 66:   delete "users;" and insert --users--.
Column 11, line 29:  delete "usher" and insert --user--.

Column 13, line 45:  delete "data" and insert --data,--.
Column 13, line 54:  delete "system" and insert --system,--.
Column 14, line 14:  delete ";"
Column 14, line 32:  delete "data" and insert --data,--.
Column 14, line 41:  delete "spread-spectrum coma" and insert
                     --spread spectrum CDMA--.
```

UNITED STATES PATENT AND TRADEMARK OFFICE
CERTIFICATE OF CORRECTION

PATENT NO. : 5,351,269
DATED : September 27, 1994
INVENTOR(S) : Donald L. Schilling It is certified that error appears in the above-indentified patent and that said Letters Patent is hereby corrected as shown below:

Column 14, line 50: delete the first "in".
Column 15, line 28: after "PCN" insert --unit.--.

Signed and Sealed this

Twelfth Day of September, 1995

Attest:

BRUCE LEHMAN

Attesting Officer

Commissioner of Patents and Trademarks